Nov. 8, 1955    W. B. LOCKWOOD    2,722,976
ATTACHING MEANS FOR SPRING CUSHION SEAT COVER
Filed Oct. 31, 1951    2 Sheets-Sheet 1

INVENTOR.
William B. Lockwood
BY Maxwell K. Murphy
ATTORNEY.

Nov. 8, 1955 W. B. LOCKWOOD 2,722,976
ATTACHING MEANS FOR SPRING CUSHION SEAT COVER
Filed Oct. 31, 1951 2 Sheets-Sheet 2
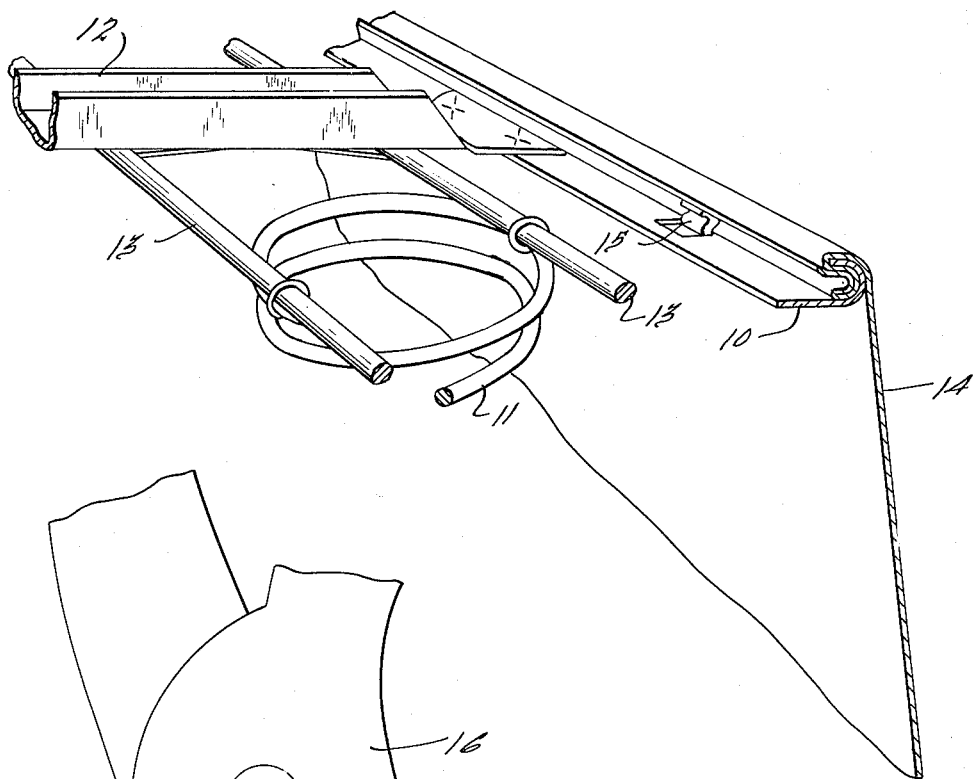
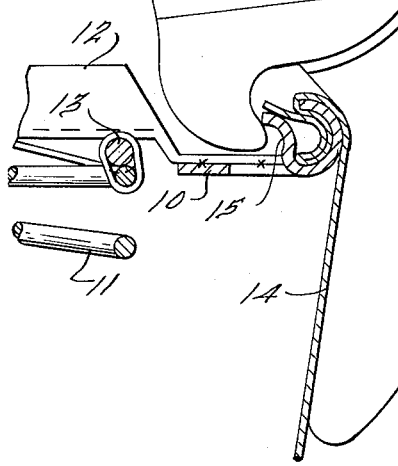
INVENTOR.
William B. Lockwood.
BY Maxwell K. Murphy
ATTORNEY.

United States Patent Office 2,722,976
Patented Nov. 8, 1955

2,722,976
ATTACHING MEANS FOR SPRING CUSHION SEAT COVER

William B. Lockwood, Danville, Ill., assignor to F. L. Jacobs Co., Detroit, Mich., a corporation of Michigan Application October 31, 1951, Serial No. 254,118

1 Claim. (Cl. 155—180)

This invention relates to improvements in seat cushions and seat backs, particularly automobile seat cushions and backs. More specifically, it pertains to improved means for securing the trim or cover of the cushion or back to the bottom frame thereof.

The known methods of securing the upholstery cover to the bottom frame of a seat cushion or back include the use of tacking strips, spring clips, hooks, etc. These possess disadvantages in that the cushions or backs trimmed by means of such devices are difficult to repair because the devices become lost or deformed to the extent that they cannot be reused when the cover is once removed, and the trim material is frequently damaged during removal.

In my improved seat cushion and back construction, I provide integral tabs in the bottoms frame member, which tabs are easily bent by means of a hand tool to secure the bottom edge of the trim material. If it is necessary to remove the trim for repair of the cushion or back, the tabs may be bent sufficiently to release the material without damage thereto and then bent back to holding position upon reassembly of the cushion.

The accompanying drawing shows an example of my improved securing means.

In the drawing:

Fig. 3 is a fragmentary perspective of the inverted cushion showing the trim secured to the bottom frame member by the tabs; and Fig. 4 is a section through the frame illustrating the method of bending the tabs to secure the trim.

Figure 1:
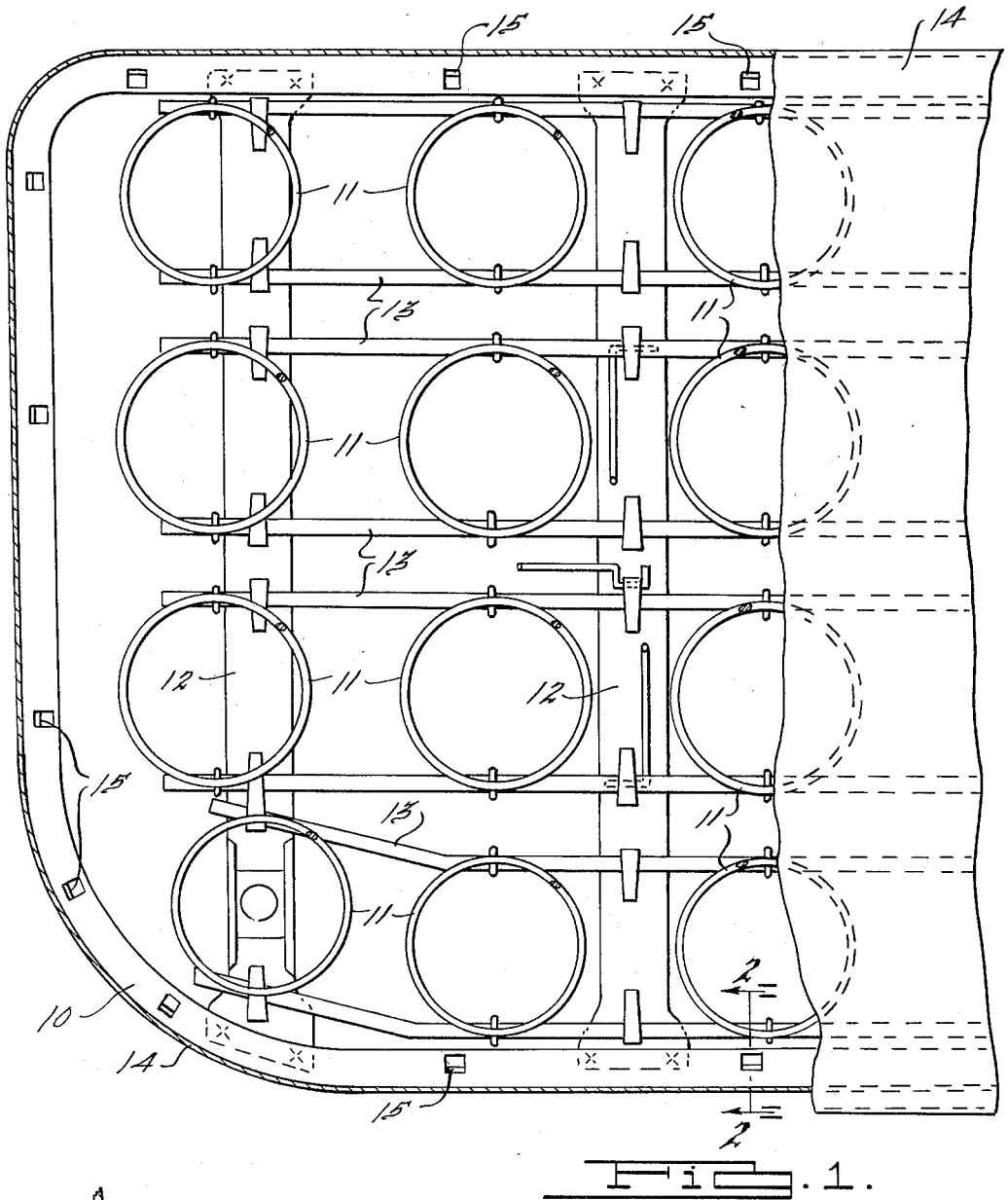
Fig. 1 is a fragmentary plan, as viewed from the top, of a seat cushion embodying the invention.

Referring to the drawing, it may be seen that the seat cushion comprises a bottom frame 10, a plurality of coil springs 11, cross slats 12, spring retainers 13 and cover 14. The cover may be of leather or other suitable material.

The bottom frame member 10 extends completely around the cushion and is rolled in substantially J-shape with one leg thereof considerably elongated. The cross slats 12 are preferably welded to the elongated portion as shown.

At intervals along the member 10, tabs 15 are provided. These tabs are formed by lancing the long leg of the J-section after rolling, and they may be spaced as required.

Fig. 4 is a section through the J-frame at one of the tab locations and shows the tab before it is deformed into clamping position.

The upholstery cover 14 is drawn smoothly and tightly around the short leg of the J-frame as shown, the cushion being placed under slight compression as is common in the industry. I prefer to fold over the marginal edge portion of the cover and tuck the fold into the space between the tab and frame portion as shown. The tab is then engaged by a special tool 16, similar to a pincers, the other jaw of which engages the cover 14 at the region where it contacts the outer surface of the J-frame.

Figure 2:
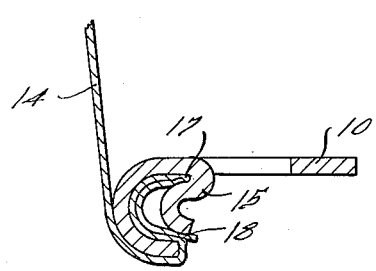
Fig. 2 is a section along line 2—2 of Fig. 1.

Operation of the tool 16 will bend the tab 15 into the position shown in Figs. 2 and 3, whereupon the cover 14 is gripped at two spaced points, i. e. at the edge 17 of the fold and at 18 where the outer portion of the tab engages a double thickness of material.

The trim material is thus securely held in place by the deformed tab 15. Because it is held at two points, either of which would be sufficient, possibility of the material pulling away from the J-frame because of careless workmanship during assembly is considerably reduced and in most instances eliminated.

Whenever it is desired to remove the upholstery cover for inspection or repair of the spring cushion, a screw driver or other suitable tool may be inserted at the point 18 for the purpose of bending the tab 15 sufficiently to release the fabric. This may be accomplished without damage to the material, and the latter is readily secured in place again by bending the tab to its securing position.

After a short period of training, workmen become extremely proficient in operating the tools 16 and in fastening the trim on cushions. The operation can be carried on rapidly without particular need for care and accuracy and without the necessity of bothering with loose fasteners such as clips, rings, tacks, etc.

While I have shown a portion of a particular seat cushion for illustrative purposes, it is to be understood that my invention is applicable to almost any kind of cushion and the shape, size, spacing, etc., of the various parts may be varied to suit each individual case.

I claim:

In a seat cushion including a plurality of spring elements, a frame structure for supporting said spring elements and a sheet of covering material disposed over said elements; said frame structure including a peripheral frame member J-shaped in cross section with the legs of the J horizontally disposed and projecting inwardly from the connecting portion thereof and with the shorter leg of the J disposed below the longer leg thereof, said covering material being wrapped around the outer periphery of said connecting portion of said J frame and then bent back upon itself to provide a double thickness edge portion, said edge portion being nested in the concavity formed between the legs of the J, and a plurality of integral tabs struck out from the longer leg of the J and bent into said concavity to clamp said folded edge portion of said covering material between said tabs and the underside of said longer leg and between the ends of said tabs and said shorter leg.

References Cited in the file of this patent

UNITED STATES PATENTS

| | | |
|---|---|---|
| 1,491,047 | King | Apr. 22, 1924 |
| 1,524,037 | King | Jan. 27, 1925 |
| 2,117,748 | Stewart | May 17, 1938 |